Patented Nov. 12, 1946

2,410,885

UNITED STATES PATENT OFFICE 2,410,885

CONDENSATION PRODUCTS AND METHODS OF PREPARING AND USING SAME

Eugene Lieber, West New Brighton, N. Y., assignor to Standard Oil Development Company, a corporation of Delaware No Drawing. Application March 25, 1943, Serial No. 480,563

9 Claims. (Cl. 252—59)

This invention relates to a novel chemical condensation product and to methods of preparing and using same, and more particularly it relates to improvements in pour depressors such as made by a Friedel-Crafts condensation of chlorinated paraffin wax with naphthalene.

Pour depressors, which are substances to be used in small amounts in waxy mineral lubricating oils to facilitate their flowing at low temperatures, can be made by various methods, but one of the most important methods used heretofore comprises the condensation of long chain aliphatic compounds (e. g., containing more than 10 carbon atoms), either alone or preferably together with aromatic ring compounds, by means of a Friedel-Crafts catalyst. Among the aliphatic compounds, chlorinated hydrocarbon waxes are preferred, such as chlorinated paraffin wax, although other reactive aliphatic compounds may be used, by which term "reactive" is meant containing some group such as one or more halogen atoms or olefin bonds permitting them to polymerize or to react with an aromatic ring. Such derivatives of petrolatum, fatty acids, fatty alcohols, etc., or other high molecular weight aliphatic compounds may also be used.

The aromatic compound, if used, should preferably be a hydrocarbon such as naphthalene, anthracene, diphenyl or the like, or a phenolic compound such as phenol, the naphthols, anthrols, ketones, etc. or amines such as naphthylamine, aniline, etc., or other aromatic products, such as aromatic esters, ethers, ketones, and the like, as well as methyl, ethyl, amyl and other alkyl derivatives of such aromatic compounds.

In carrying out the condensation of such aliphatic and aromatic materials, a Friedel-Crafts catalyst is used, preferably anhydrous aluminum chloride, although others such as boron fluoride, titanium tetrachloride, stannic chloride, ferric chloride, zinc chloride, etc., may be used. The amount of such catalyst to be used may range from about 1% to 40% or 50%, but preferably about 2% to 10% or 15% based on the weight of long chain aliphatic material used, such as chlorinated paraffin wax. Likewise the proportion of aromatic compounds should be about 5 to 25, or preferably about 10 to 15% by weight, based on the amount of long chain aliphatic material used. The best reaction conditions vary with the different compounds used, but it appears that the temperatures from about room temperature to about 250° F. may be employed. Solvents of the type of kerosene, tetrachlorethane, dichlorbenzene, may be used and these are desirable, although not necessary, and it is preferred to thoroughly agitate the mixture during the reaction period which may be from 1 to 10 hours and even longer, depending on the temperature and other conditions. It is preferred to hydrolyze the catalyst with water or other hydrolyzing agent after the reaction and then separate the inorganic products of hydrolysis. The low boiling constituents are then distilled off to say 450° F. to 600° F. and the pour depressant is collected as a distillation residue.

Condensation products made by the process just described are useful as pour depressors in waxy mineral lubricating oils and are sold, either in the concentrated form in which they are prepared or else dissolved in about 1 to 5 parts of a lubricating oil base stock, in order to facilitate quick and uniform solution in the lubricating oils in which they are to be used. In the following description, such materials are termed "initial pour depressors."

It has now been discovered that such initial pour depressors can be markedly improved by further treatment with a catalyst of the Friedel-Crafts type, the same as used in the original condensation reaction. According to tests, this recondensation gives different results and better results than would be obtained merely by the use of a larger amount of catalyst for a longer reaction time in the original condensation, or the further subsequent addition of catalyst in the original condensation. In carrying out this recondensation according to the present invention, aluminum chloride is preferably used as catalyst, and the amount thereof is preferably about 5 to 50 parts to every 100 parts by weight of initial pour depressor, although this figure will vary with reaction conditions, such as the amount of solvent used, the rate of addition of the catalyst, the intensity and amount of stirring, temperature at time of contact, all of which are important factors controlling the improvement in pour-depressing potency obtained. Although these factors may be varied to some extent, and the optimum combination for use with the particular materials available may be determined by a few experiments, a number of specific examples of suitable reaction conditions will be given later for the sake of illustration. The following ranges of reaction conditions are preferred, and although not necessary, it is preferred to use a solvent such as a saturated hydrocarbon or a non-reactive chlorinated hydrocarbon such as tetrachlorethane or dichlorbenzene. The temperatures should be regulated between about 50° F. and 200° F., or preferably about 70–100° F. The contact period or reaction time should vary with the quantity of catalyst and temperature used, but usually will be between ½ to 10 hours or longer, preferably about 1–5 hours. If the treatment is too vigorous, i. e. if the amount of catalyst or the temperature is too high, or the time of contact too long, etc., there seems to be a reversal of the progress towards increasing pour-depressing potency, and this potency may actually decrease. One or more factors may be varied considerably if suitable compensation is made in other factors within the ranges indicated above.

The preferred order of mixing the materials is to dissolve the initial pour depressor in the solvent to be used, and then to add the aluminum chloride or other Friedel-Crafts catalyst, preferably slowly and with agitation. After the treatment with the catalyst, the product is preferably neutralized with water, alcohol, or other alkaline reagents, a further amount of solvent diluent added to assist the settling of the inorganic constituents comprising the catalyst sludge, and then the reaction mixture is subjected to distillation under reduced pressure, such as by fire and steam or by vacuum, e. g., 5–100 mm. or preferably about 10–50 mm. mercury absolute pressure to a final temperature of at least 400° F., e. g., if under 5 mm. pressure, and preferably 500 or 600° F., if the pressure is not quite so low. The distillation residue constitutes the improved pour depressor, i. e. recondensed product.

This improved pour depressor has a much greater pour-depressing potency than the initial pour depressor from which it was made, and therefore when incorporated into waxy mineral lubricating oils to depress the pour point thereof, the amount to be used may range from about 1% down to as low as .01%, generally about 0.2% to .05% being sufficient.

The objects and advantages of the invention and the method of carrying it out will be better understood from the following examples which are given merely for the sake of illustration and without intending to limit the invention to the particular materials, quantities, and reaction conditions used.

A commercial pour depressor was obtained which had been made as follows: 100 parts of a paraffin wax, chlorinated to 12% chlorine content was slowly added to a mixture of 15 parts of naphthalene and 2½ parts of AlCl₃ suspended in 40 parts of refined kerosene as solvent, which was agitated and maintained at 90° F. during the addition of the chlor-wax which required 2 hours for addition. After the addition of the chlor-wax, the reaction mixture was maintained at 90° F. for 2 additional hours and then neutralized with a mixture of isopropyl alcohol and aqueous NaOH. After settling, the product was recovered as a bottoms by distillation with fire and steam to 600° F. The distillation residue was used directly as such, i. e. without any dilution with lubricating oil, for making the following test.

Example 1

200 grams of this "initial pour depressant" were dissolved in 200 cc. of tetrachlorethane as solvent, contained in a 1-liter Erlenmeyer flask fitted with a CaCl₂ drying tube. 65 grams of anhydrous AlCl₃ were added over a period of 30 minutes with vigorous agitation. The reaction mixture was then allowed to stand with occasional severe agitation (every 10 minutes) for 1 hour. The reaction mixture was then poured into an alcohol-water mixture to decompose the AlCl₃ and the product was extracted with 700 cc. of kerosene. After separating from the aqueous layer, the kerosene extract was distilled with fire and steam to 600° F. holding at this temperature for 10 minutes. A distillation residue of 187 grams was obtained and is called "recondensed pour depressant 1."

In order to test the pour depressor potency of the "initial" and "recondensed" products, they were added in different amounts to a wax-bearing lubricating oil which was a mixture of a spindle oil and a bright stock. This oil had a pour point of +30° F. The pour points were determined by the A. S. T. M. procedure. The following table summarizes the comparative results obtained:

| Per cent added to waxy oil | Pour points (° F.) of blended oil | | |
|---|---|---|---|
|  | Initial | Recondensed "1" | Difference, ° F. |
| 0.15 | −15 | −25 | −10 |
| 0.075 | −5 | −15 | −10 |
| 0.0375 | +10 | −10 | −20 |

These data show that recondensation effected a marked and unexpected improvement by increasing the pour-depressing potency of the product.

In order to further test the pour depressor potency of the "initial pour depressant" and the "recondensed pour depressant 1," they were added in various amounts to an aviation grade oil of 80 Saybolt seconds viscosity at 210° F. having an initial pour point of +30° F. The following table shows the comparative results obtained:

| Percent added to aviation oil | Pour points (° F.) of blended oil | | |
|---|---|---|---|
|  | Initial | Recondensed "1" | Difference, ° F. |
| 0.25 | −15 | −25 | −10 |
| 0.20 | −10 | −25 | −15 |
| 0.15 | −5 | −15 | −10 |
| 0.10 | +5 | −5 | −10 |

These figures indicate that the recondensed product has the same unexpected increase in effectiveness in an aviation grade oil as in a blend of spindle oil and bright stock.

Example 2

200 grams of the "initial pour depressant" (the same as used in Example 1) were dissolved in refined kerosene and treated with 65 grams of AlCl₃ exactly as described in Example 1, the only difference being the use of kerosene instead of tetrachlorethane as solvent. A recovery of 185 grams of "recondensed pour depressant 2" was obtained.

The initial and recondensed products were added in various percentages to the same test oils as used previously and the following comparative data were obtained:

| Test oil | Percent added | Pour points (° F.) of blended oil | | |
|---|---|---|---|---|
| | | Initial | Recondensed "2" | Difference, ° F. |
| Spindle+Bright Stock | 0.15 | −15 | −20 | −5 |
| | 0.075 | −5 | −10 | −5 |
| | 0.0375 | +10 | −5 | −15 |
| Aviation | 0.25 | −15 | −25 | −10 |
| | 0.20 | −10 | −25 | −15 |
| | 0.15 | −5 | −15 | −10 |
| | 0.10 | +5 | −10 | −15 |

These data indicate that refined kerosene is substantially as good as the tetrachlorethane of Example 1 for use as solvent in the recondensation reaction.

Example 3

500 grams of the "initial pour depressant" (the same as used in Example 1) were dissolved in 300 cc. of tetrachlorethane as solvent and placed in a 3-liter, 4-necked flask, equipped with an inlet tube for boron fluoride ($BF_3$), a mechanical agitator driven by a high speed motor, a thermometer, and an outlet tube connected to a $CaCl_2$ drying tube. The reactor was cooled in a water bath to 50° F., the agitator was started, and the $BF_3$ gas was slowly bubbled into the reaction mixture. Eleven grams of $BF_3$ were introduced over a period of 5 hours while maintaining vigorous agitation and a temperature of 50° F. The agitator was then stopped and the reaction mixture was allowed to remain quiescent at room temperature overnight (16 hours). The reaction mixture was then diluted with 1 liter of kerosene and the $BF_3$ destroyed by 500 cc. of an alcohol-water mixture. After separating from the inorganic constituents contained in the aqueous layer, the kerosene extract was distilled with fire and steam to 600° F. A distillation residue of 490 grams was obtained and is called "recondensed pour depressant 3."

In order to test the pour depressor potency of the initial and recondensed products, they were added in various amounts to the spindle oil +bright stock mixture used previously. The following table summarizes the comparative results obtained:

| Per cent added to waxy oil | Pour points (° F.) of blended oils | | |
|---|---|---|---|
| | Initial | Recondensed "3" | Difference, ° F. |
| 0.15 | −15 | −20 | −5 |
| 0.075 | −5 | −15 | −10 |
| 0.0375 | +10 | 0 | −10 |

These data show that $BF_3$ effected the recondensation almost as well as the $AlCl_3$ used in Example 1.

Example 4

Example 1 was repeated exactly except that the total time of reaction was extended to 4 hours. On recovery of the product a yield of 192 grams of recondensed pour depressant "4" was obtained.

The pour depressor potency of the improved product was tested as previously described using the "spindle oil+bright stock" mixture with the following results being obtained:

| Per cent added to waxy oil | Pour point (° F.) of blended oils | | |
|---|---|---|---|
| | Initial | Recondensed "4" | Difference, ° F. |
| 0.15 | −15 | −20 | −5 |
| 0.075 | −5 | −20 | −15 |
| 0.0375 | +10 | −15 | −25 |

These tests show an exceptionally great improvement in potency when the pour depressor is used in very small concentrations.

Example 5

Example 2 was repeated exactly except that the total time of reaction was extended to six hours. On recovery of the product a yield of 192 grams of "recondensed pour depressant 5" was obtained.

The pour depressor potency of the improved product was tested as previously described using the "spindle oil+bright stock" mixture with the following results being obtained:

| Per cent added to waxy oil | Pour point (° F.) of blended oils | | |
|---|---|---|---|
| | Initial | Recondensed "5" | Difference, ° F. |
| 0.15 | −15 | −20 | −5 |
| 0.075 | −5 | −10 | −10 |
| 0.0375 | +10 | −5 | −15 |

It is thus seen that the recondensation of the initial pour depressor with a Friedel-Crafts catalyst resulted in a recondensed product of much greater pour-depressing potency.

The pour depressant potency improvements are not obtained on adding a further quantity of $AlCl_3$ to the original condensation mixture before isolation of the product, as carried out in the following experiment.

100 parts by weight of chlorinated paraffin wax, containing 13.2% chlorine, were slowly added to a mixture of 13½ parts of naphthalene and 4 parts of $AlCl_3$ contained in 43 parts of tetrachlorethane as solvent. The reaction mixture was maintained at 90° F. and the chloro-wax was added in 30 minutes. After a total of 3 hours reaction time, a portion of this reaction mixture was removed, neutralized and the "initial pour depressant product" was recovered by a fire and steam distillation to 600° F.

To the remainder of the reaction mixture contained in the agitator was added an additional 10 parts of $AlCl_3$ and the reaction continued for an additional one hour to obtain further condensation, if possible. After neutralization, the product was recovered as a distillation residue by a fire and steam distillation to 600° F., and is called "further treated" product.

The pour depressor potency of both "initial" and "further treated" products was tested as previously described using the "spindle oil+ bright stock" mixture with the following results being obtained:

| Percent added to waxy oil | Pour point (° F.) of blended oils | | |
|---|---|---|---|
| | Initial | Further treated | Difference, ° F. |
| 0.15 | −20 | −20 | 0 |
| 0.075 | −10 | −5 | +5 |
| 0.0375 | 0 | +5 | +5 |

These data indicate an actual raising of the pour point and therefore a decrease in pour depressant potency when the original condensation product is further treated with AlCl₃ before isolation from the reaction mixture, whereas Examples 1 to 5 show that according to this invention if the initial pour depressant product is actually isolated from the reaction mass by neutralizing and removing the catalyst and distilling off any unreacted raw materials and volatile or low molecular weight condensation products, and then recondensed by a Friedel-Crafts catalyst, the pour depressant potency is substantially increased.

In the accompanying claims the term recondensation is intended to mean simple recondensation of the initial condensation product per se, or in other words autocondensation, by treatment with a Friedel-Crafts catalyst but without any other reagent.

It is not intended that this invention be limited to the particular materials and reaction conditions which have been given merely for the sake of illustration, nor unnecessarily by any theory suggested as to the mechanism and the operation of the invention, but only by the appended claims in which it is intended to claim all novelty inherent in the invention as well as all modifications coming within the scope and spirit of the invention.

I claim:

1. The process which comprises condensing a long chain aliphatic compound containing a reactive group selected from halogen atoms and olefin bonds in the presence of a Friedel-Crafts catalyst, hydrolyzing and removing the catalyst, distilling the condensation products under reduced pressure to at least 400° F. and subjecting the resulting distillation residue to recondensation in the presence of a Friedel-Crafts catalyst.

2. The process which comprises condensing a long chain aliphatic compound containing a reactive group selected from halogen atoms and olefin bonds, with an aromatic compound in the presence of a Friedel-Crafts catalyst, hydrolyzing and removing the catalyst, distilling the condensation products under reduced pressure to at least 400° F. and subjecting the resulting distillation residue to recondensation in the presence of a Friedel-Crafts catalyst.

3. The process which comprises condensing chlorinated paraffin wax with naphthalene in the presence of aluminum chloride and in the presence of an inert solvent, to make a high molecular weight wax-naphthalene condensation product having pour-depressing properties, hydrolyzing and removing the catalyst and subjecting the reaction mixture to distillation with fire and steam to about 600° F. to obtain an initial pour depressor as distillation residue, and subjecting said initial pour depressor to recondensation with aluminum chloride at a temperature of about 50–200° F. for about ½ hour to 10 hours in the presence of an inert solvent, hydrolyzing and removing the catalyst and distilling the reaction mixture with fire and steam to about 600° F. to obtain as distillation residue a recondensed pour depressor having substantially improved pour-depressing potency.

4. Process according to claim 1 in which the long chain aliphatic compound used is chlorinated paraffin wax.

5. Process according to claim 1 in which about 1% to 50% by weight of aluminum chloride based on the weight of long chain aliphatic compound is used as catalyst in the first condensation, and about 5 to 50 parts by weight of aluminum chloride per 100 parts of distillation residue from the first condensation product are used as catalyst in the recondensation.

6. A high molecular weight product substantially non-volatile up to about 600° F. under reduced pressure, soluble in waxy mineral lubricating oil and having the property of depressing the pour point thereof when added thereto in small amounts, said product being a Friedel-Crafts recondensation product of only the high molecular weight oil-soluble pour depressing fraction substantially non-volatile up to about 600° F. under reduced pressure of an initial Friedel-Crafts condensation product of a long chain aliphatic compound containing a reactive group selected from halogen atoms and olefin bonds, said recondensation product having better pour depressing properties than said initial condensation product.

7. A high molecular weight product substantially non-volatile up to about 600° F. under reduced pressure, soluble in waxy mineral lubricating oil and having the property of depressing the pour point thereof when added thereto in small amounts, said product being an aluminum chloride recondensation product of only the high molecular weight oil-soluble pour depressing fraction substantially non-volatile up to about 600° F. under reduced pressure of an initial aluminum chloride condensation product of chlorinated paraffin wax and naphthalene, said recondensation product having better pour depressing properties than said initial condensation product.

8. A composition comprising a major proportion of a waxy mineral lubricating oil and a small but pour depressing amount of a high molecular weight product substantially non-volatile up to about 600° F. under reduced pressure, soluble in waxy mineral lubricating oil and having the property of depressing the pour point thereof when added thereto in small amounts, said product being a Friedel-Crafts recondensation product of only the high molecular weight oil-soluble pour depressing fraction substantially non-volatile up to about 600° F. under reduced pressure of an initial Friedel-Crafts condensation product of a long chain aliphatic compound containing a reactive group selected from halogen atoms and olefin bonds, said recondensation product having better pour depressing properties than said initial condensation product.

9. A composition comprising a major proportion of a waxy mineral lubricating oil having dissolved therein a small but pour depressing amount of a high molecular weight product substantially non-volatile up to about 600° F. under reduced pressure, soluble in waxy mineral lubricating oil and having the property of depressing the pour point thereof when added thereto in small amounts, said product being an aluminum chloride recondensation product of only the high molecular weight oil-soluble pour depressing fraction substantially non-volatile up to about 600° F. under reduced pressure of an initial aluminum chloride condensation product of chlorinated paraffin wax and naphthalene, said recondensation product having better pour depressing properties than said initial condensation product.

EUGENE LIEBER.